United States Patent [19]

Boguslawski

[11] Patent Number: 5,000,930
[45] Date of Patent: Mar. 19, 1991

[54] METHOD AND INSTALLATION FOR THE PURIFICATION OF COMBUSTION GAS FROM DOMESTIC HEATINGS, COMBUSTION ENGINES OR SIMILAR HEATINGS

[76] Inventor: Zbigniew Boguslawski, Frankfurter Str. 167, D-6078 Neu Isenburg, Fed. Rep. of Germany

[21] Appl. No.: 740,913
[22] PCT Filed: Apr. 10, 1984
[86] PCT No.: PCT/EP84/00108
§ 371 Date: May 22, 1985
§ 102(e) Date: May 22, 1985
[87] PCT Pub. No.: WO84/04053
PCT Pub. Date: Oct. 25, 1984

[30] Foreign Application Priority Data

Apr. 11, 1983 [DE] Fed. Rep. of Germany ....... 3312890

[51] Int. Cl.$^5$ .............................................. B01D 53/36
[52] U.S. Cl. ...................................... 423/239; 423/247
[58] Field of Search ......................... 423/239, 272, 247

[56] References Cited

U.S. PATENT DOCUMENTS

| | | | |
|---|---|---|---|
| 3,034,853 | 5/1962 | Schmidt et al. | 423/235 |
| 3,382,033 | 5/1968 | Kitagawa | 423/239 |
| 3,897,539 | 7/1975 | Fleming | 423/239 |
| 3,905,917 | 9/1975 | Nishino et al. | 502/241 |
| 4,097,576 | 6/1978 | Tamura et al. | 423/239 |
| 4,201,751 | 5/1980 | Holter et al. | 423/210 |
| 4,230,741 | 10/1980 | Yamazaki et al. | 427/106 |
| 4,277,556 | 7/1981 | Kobashi et al. | 430/393 |

FOREIGN PATENT DOCUMENTS 27062 3/1977 Japan .................................. 423/239

OTHER PUBLICATIONS

Abstract, German Patent 2,837,175 (Mar. 1, 1979).

Primary Examiner—Jeffrey Edwin Russel
Attorney, Agent, or Firm—Fulbright & Jaworski

[57] ABSTRACT

A process for the purification of combustion gases from domestic heating installations, internal combustion engines and similar small combustion installations, by removal of their oxidic sulfur and nitrogen impurities by means of a material which chemically binds the impurities, wherein the combustion gas is passed through a bed of high-porosity pellets, which contain metal oxides as the active material and also manganese dioxide ($MnO_2$), and the impurities are thus deposited on the metal oxides. For the treatment of combustion gases arising at a high temperature of about 500° C. and higher, for example the waste gases taken off from the high-temperature side of power stations or from the manifold of a motor vehicle engine, the pellets contain a proportion of 3–8% by weight, advantageously 4–6% by weight, of coal dust and 5–15% by weight, advantageously 8–13.5% by weight, of iron-III oxide, whereas the pellets for the purification of combustion gases arising at a low temperature of about 120° to 300° C., for example the waste gases from domestic heating installations, contain potassium chlorate and/or hydrogen peroxide in a quantity of between 3 and 8% by weight, advantageously between 4 and 5.5% by weight, as the oxidizing agent. The active material contains 15–40, preferably 25–35%, by weight of slag, fly dust or fly ash.

26 Claims, 1 Drawing Sheet

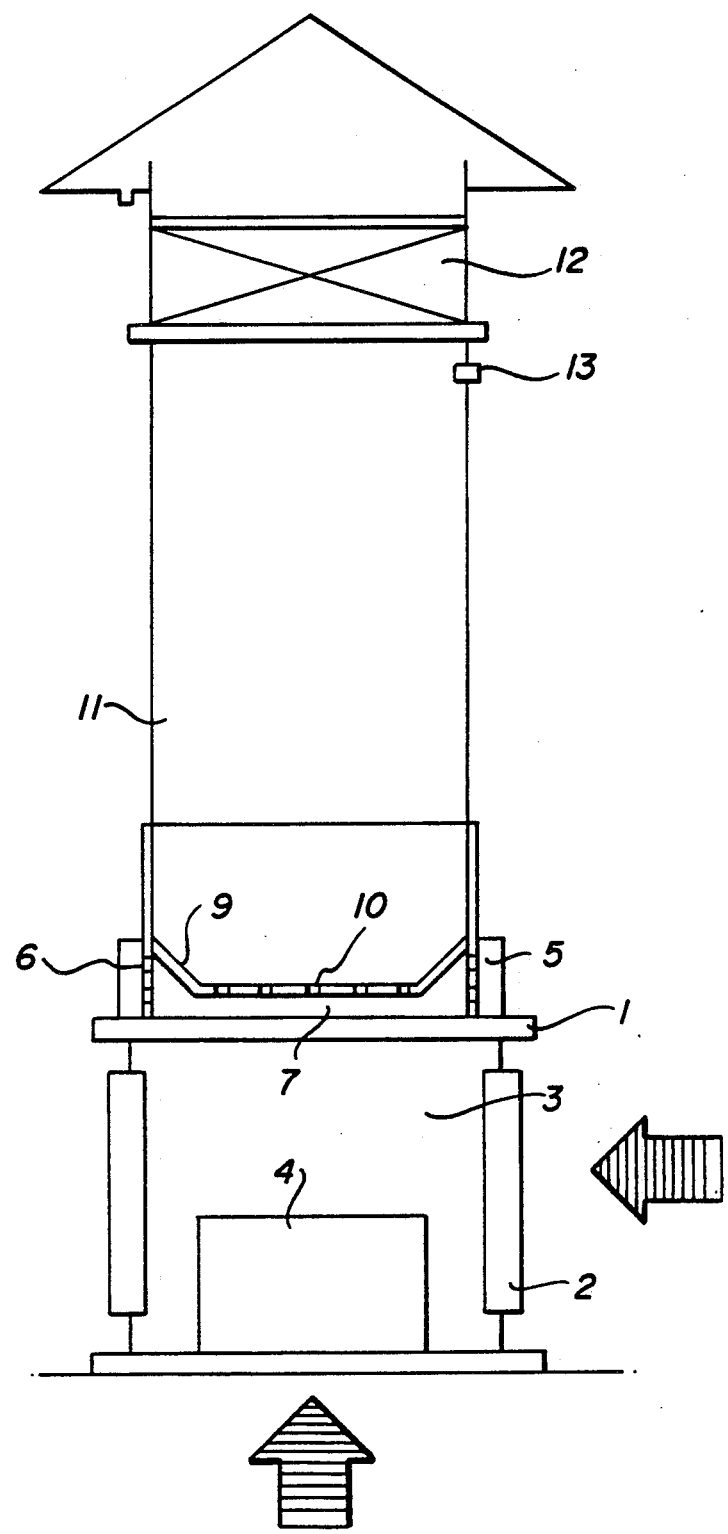

METHOD AND INSTALLATION FOR THE PURIFICATION OF COMBUSTION GAS FROM DOMESTIC HEATINGS, COMBUSTION ENGINES OR SIMILAR HEATINGS

The invention relates to a process for the purification of combustion gases from, for example, domestic heating installations, internal combustion engines or similar combustion installations, by removal of sulfur dioxide, sulfur trioxide, nitrogen oxides and carbon monoxide by means of a material which chemically converts and binds the impurities.

It is known that more than half of the fossil fuels required for energy supply are used domestically and in the transport field, so that correspondingly more than half of the emissions discharged from these sources into the atmosphere have their origin in private households and in the transport field, in particular motor vehicle traffic. Air pollution by the large number of private households and motor vehicles, or the prevention of this pollution, is therefore an urgent, hitherto completely unsolved problem, in particular since the methods employed for reducing the emissions of $SO_2$ and $NO_x$ in large and medium-sized combustion installations, such as, especially, large and medium-sized power stations, cannot be used in the applications concerned here, because of the required equipment and operating materials. Furthermore, the major part of the carbon monoxide impurities which are regarded as particularly toxic are emitted by the said small combustion installations, in particular by the about 30 million motor vehicles registered in the Federal Republic of Germany.

According to the available statistics, it can be assumed that the air pollution to be taken into account is caused to the extent of about 35% by industrial combustion installations, to the extent of about 25% by domestic heating installations and to the extent of about 40% by motor vehicle traffic, the proportion of motor vehicle traffic in the total emission being approximately as follows:

| Pollutant | Total emission (million tonnes) | Emission by motor vehicles (million tonnes) | Proportion (%) |
|---|---|---|---|
| CO | 35.7 | 35.0 | 98.0 |
| $C_mH_n$ | 7.7 | 3.5 | 45.0 |
| $NO_x$ | 7.35 | 3.15 | 43.0 |
| $SO_x$ | 3.5 | 0.35 | 2.5 |

In conjunction with the global FIGURES given for the proportions of the individual components in the total emission, the above table shows that carbon monoxide can be virtually disregarded in the purification of industrial and domestic waste gases, moreover that the nitrogen oxides, which are particularly difficult to deal with, can be neglected in the purification of the waste gases from domestic heating, whereas the sulfur dioxide impurities, which particularly in recent times have been extensively discussed, must be ascribed in approximately equal parts to the domestic waste gases and the industrial waste gases.

It is the object of the present invention to provide a process for the purification of flue gases, combustion gases and process gases, by means of which process especially the highly polluting sulfur dioxide, sulfur trioxide and carbon monoxide impurities as well as nitrogen oxides can be separated off and which allows economical use not only in large units but also in very small units and thus allows purification of the waste gases, arising in domestic heating installations, motor vehicles and similar small combustion installations, under economical conditions. The invention comprises passing the combustion gas through a bed of high-porosity pellets, which contain metal oxides as the active material and, in the case of the presence of nitrogen oxides, also manganese dioxide ($MnO_2$), and thus depositing the impurities on the metal oxides.

The invention provides a process, by means of which the impurities contained in the combustion gases are brought with the aid of a special purification material (Moxide) into a form in which bonding to the metal oxides or detoxification of a pollutant is possible, so that overall a very extensive removal of the noxious or toxic gaseous impurities from the combustion gases is achieved in a single process step. Depending on the type of the process procedure or the temperature of the gases arising, the manganese dioxide here serves either as a direct oxidizing agent for the nitrogen oxides, according to the dissociation reaction, which is reversible above 500° C.

$$4MnO_2 \rightleftharpoons 2Mn_2O_3 + O_2$$

the manganese dioxide merely acting as an "intermediate carrier" in the presence of excess oxygen, in the sense that the oxygen released is immediately reabsorbed from the combustion gas and the manganese dioxide is thus regenerated. In the other case, that is to say in particular at low gas temperatures, the manganese dioxide acts as a quasi-catalyst for providing a high oxygen concentration near to the epicenters of the active material or as a "true" catalyst for accelerating the conversion and oxidation reaction. In particular, the nitrogen monoxide/nitrogen dioxide ratio in the gas is here adjusted to equimolar amounts by oxidation of a corresponding proportion of the nitrogen monoxide contained in the gas to nitrogen dioxide, so that the proportion of nitrogen oxide impurities in the combustion gas corresponds, in terms of quantitative chemistry, to the compound $N_2O_3$ and, as a result, direct and complete chemical binding of the nitrogen oxide impurity is also achieved. The high porosity of Moxide also exerts a filter effect with respect to very fine physical impurities, for example heavy metal oxides, such as lead oxide from motor vehicle exhaust gases. A further essential advantage of the process of the invention also is that all the important impurities are dealt with in one process step so that, with acceptably low cost, a purification of combustion gases from small units, such as domestic heating installations, motor vehicles or the like, is also possible.

In one embodiment of the invention, the pellets for the treatment of combustion gases arising at a high temperature of about 500° C. and higher, for example the waste gases taken off from the high-temperature side of power stations or from the manifold of a motor vehicle engine—which may be heat-insulated—contain a proportion of 3–8% by weight, advantageously 4–6% by weight, of coal dust and 5–15% by weight, advantageously 8–13.5% by weight, of iron-III oxide. In this case, the manganese dioxide contained in the purification material acts as an oxidizing agent in accordance with the equation

$$2NO + O_2 = 2NO_2 + 13.64 Kcal \qquad (1)$$

$$NO + NO_2 = N_2O_3 + 9.49 \text{Kcal} \quad (2)$$

the result being that the nitrogen oxides are deposited on the metal oxide in accordance with the equation $$Me(OH)_2 + (NO + NO_2) + O_2 = Me(NO_3)_2 + H_2O \quad (3)$$

whereas the carbon monoxide, due to the presence of excess carbon on the one hand (Boudouart reaction) and the catalytic effect of the iron-III oxide on the other hand is converted according to the reactions $$2CO \rightleftharpoons C + CO_2 \quad (4)$$

$$CO + H_2O \rightarrow CO_2 + H_2 \quad (5)$$

and the sulfur oxides are bound to the metal oxide in accordance with the equations $$Me(OH)_2 + SO_2 = MeSO_3 + H_2O \quad (6)$$

$$Me(OH)_2 + SO_4 = MeSO_4 + H_2O \quad (7)$$

the $CO_2$ escaping into the atmosphere.

In a further embodiment of the invention, the pellets for the purification of combustion gases arising at a low temperature of about 120 to 300° C., for example the waste gases from domestic heating installations, contain potassium chlorate and/or hydrogen peroxide in a quantity of between 3 and 8% by weight, preferably between 4 and 5.5 5 (sic) by weight, as an oxidizing agent. In this case, the manganese dioxide contained in the Moxide does not serve as an oxidizing agent, but as a catalyst which does not participate in the reaction even in terms of quantitative chemistry, whilst the potassium chlorate or hydrogen peroxide assume the function of the oxidizing agent. However, the presence of the catalyst results in a considerable reduction in the temperature at which the oxidizing agent, in particular potassium chlorate, releases oxygen, whereby the formation of potentially explosive potassium perchlorate is prevented. In this case, 1 part of manganese dioxide per 10 parts of potassium chlorate is advantageously employed in the treatment of gases having a temperature of less than 500° C., and 1 part of manganese dioxide per 20 parts of potassium chlorate is employed in the treatment of gases above 120° C. up to about 300° C. As a further advantage, when hydrogen peroxide is employed, its stability is improved by the addition of stabilizers, in particular barbituric acid or uric acid.

The above illustrations demonstrate the significant technical and economic advantages of the process according to the invention. Since—as stated at the outset—the nitrogen oxides can be neglected or disregarded in the purification of the waste gases from domestic heating installations in a large number of cases, the use of the low-temperature purification alternative is sufficient in these cases even without employing the oxidizing agents potassium chlorate and hydrogen peroxide, and this substantially simplifies the application of the process in the domestic field.

In a particularly advantageous embodiment of the invention, the pellets contain, as the active material, the residues from combustion processes and metallurgical treatment processes, such as slags, fly ash and/or fly dust. These materials are waste products which cannot be exploited in other ways, or only with great difficulty, and are therefore extremely cheap, and they represent an outstandingly suitable base for a large part of the applications concerned here, due to their high content of metal oxides coupled with a low content of alkali metal oxides and alkaline earth metal oxides, and due to their content of iron-III oxide and fine coal dust, so that the fly ashes or fly dusts can frequently be employed even in the compositions in which they are obtained. Where necessary, however, the material as obtained can readily be brought to the requisite optimum composition by appropriate additions. If the materials arise in the moist state, they are advantageously calcined for one hour at 800°-850° C. before use. Overall, the active material is advantageously adjusted to a content of 15-40, preferably 25-35% by weight, of fly ash and a proportion of 3-8% by weight of fine coal dust, relative to the fly ash contained in the material, the pellets advantageously containing metal oxides in a quantity of between 15 and 65% by weight, preferably between 45 and 55% by weight—of which 5 to 15% by weight, preferably 8 to 13.5% by weight, are iron-III oxide—at a content of alkali metal oxides and alkaline earth metal oxides of not more than 10% by weight, advantageously between 6 and 8% by weight. Adherence to a low content of alkali metal oxides and alkaline earth metal oxides is advisable in particular in the cases where processing of the resulting material loaded with pollutants is under consideration, in view of the high dissociation energy which makes it more difficult to eliminate the acid radicals from these metals, as compared with the metals of the higher groups of the periodic table.

The pelletized purification material advantageously has a specific catalytic surface area of 5.0-28.5 $m^2$, preferably 17.5-22.0 $m^2/g$, and a pore volume of 0.1-0.25 $cm^3/g$ at a pore diameter of 200-1,000 A, which—high-—porosity can be obtained by the addition of sand of a grain size below 2 mm, preferably below 1 mm, in a quantity of between 35 and 75% by weight, preferably between 45 and 60% by weight. If necessary for the purpose of obtaining an adequate pellet strength, an addition of cement in a quantity of between 5 and 10% by weight or kaolin in a quantity of between 3 and 5% by weight may also become necessary, in which case appropriately the pellets are dried at about 100° C.—in the case of an addition of cement—or calcined between 800° and 850° C.—in the case of an addition of kaolin.

Advantageously, the nitrogen monoxide/nitrogen dioxide ratio in the gas is adjusted to equimolar quantities by oxidizing a corresponding proportion of the nitrogen monoxide contained in the gas to nitrogen dioxide, so that the proportion of nitrogen oxide impurities in the combustion gas corresponds to the compound $N_2O_3$ in terms of quantitative chemistry and, as a result, direct and complete chemical binding of even the nitrogen impurities is obtained. Finally, before they are introduced into the pellet bed, the gases are advantageously adjusted to a water vapor content which lies at the saturation limit, but at least to a proportion of 10% by volume in a purification process carried out at a temperature above 120° C., the water vapor content being adjusted by adding water and/or by cooling the flue gas to a corresponding temperature.

In the cases where the purification of combustion gases at a high temperature which is above 500 C. is concerned, the pelletized purification material is advantageously moved in counter-current to the combustion gas, is discharged for the purpose of heat recovery, after the maximum temperature has been reached, and, after cooling, is re-introduced in circulation in the purification process.

When the process of the invention is used, the flue gases in domestic heating installations are advantageously extracted by means of a fan, the fan power being controlled as a function of the waste gas temperature, in such a way that, with falling waste gas temperature, the fan power is reduced and the power is increased with rising temperature. The resulting material consisting essentially of sulfites/sulfates or nitrites/nitrates can be processed into sulfuric acid or nitric acid respectively.

The equipment according to the invention for carrying out the process of the invention comprises a stack top or stack attachment with two chambers, of which one serves to receive the absorbent and the other serves as a deflection chamber for the flue gases and which are mutually connected by means of a perforated plate, the deflection chamber consisting of an annular channel and a distributor space, into which the deflected flue gases pass from the annular channel in the radial direction, baffles being provided in the distributor space which direct the flue gas stream to the perforated plate, with reduction of the flow cross-section.

BRIEF DESCRIPTION OF THE DRAWING

The invention is explained below by reference to several examples and to the attached drawing.

The stack top, shown diagrammatically in the drawing, for domestic or small combustion installations consists of the structure 1 with cleaning flaps 2, which structure surrounds the inlet space 3 for the flue gas and comprises a water container 4, from which the flue gas is charged with water while flowing through the inlet space. The inlet space is connected to an annular deflection chamber 5, the inner wall 6 of which is provided with flow orifices which connect the deflection chamber 5 to a distributor space 7. The annular channel serving as the deflection chamber surrounds the distributor space in the same plane, so that the deflected flue gases pass out of the annular channel in the radial direction, baffles 9 being provided in the distributor space 7 which direct the flue gas stream to a perforated plate 10, with reduction of the flow cross-section, the flue gases passing through the perforated plate into the reaction space 11 filled with pellets. At the upper end of the reaction space, there is a fan 12 and a contact thermometer 13, by means of which the draft of the stack is controlled as a function of the waste gas temperature in such a way that, with falling waste gas temperature, the fan power is reduced and the power is increased with rising temperature.

EXAMPLE 1

In a household, about 50 kg of coal are burned daily for heating purposes. At the stack inlet, the flue gases have a temperature of 120°–160° C. and the following average composition:

5,460 l of ($CO_2$+CO)
1,092 l of $O_2$
26,208 l of $N_2$ and
1,000 mg of $SO_2/Bm^3$
480 mg of $NO_x/Bm^3$ The gases are saturated with water. On average, the flue gas flow is as follows: 1,365 l/h. As a purification material, matched to the annual requirement, for these gases containing nitrogen oxides, pellets of approximately the following composition are employed:

| Fine sand | 65.3 kg | 44.3% by weight |
|---|---|---|
| Fly ash | 31.2 kg | 21.2% by weight |
| Binder | 10.0 kg | 6.8% by weight |
| Oxidizing material | 40.8 kg | 27.7% by weight |
| Total | 147.3 kg | 120 l |

For safety reasons, the purification material is used in the form of parts of material, namely on the one hand an absorption material of sand, fly ash and binder, and an oxidizing material which consists of potassium chlorate and manganese dioxide and which is pelletized separately, as a pre-product, with fine sand and binder. The absorption material is then employed in a quantity sufficient for an annual requirement, and the oxidizing material is employed in a (replaceable) quantity intended for a shorter period, for example one month. In this case, the oxidizing material (for one monthly requirement) consists of 1.22 kg of potassium chlorate, 0.13 kg of manganese dioxide, 0.7 kg of fine sand and 0.35 kg of binder (total 3.4 kg, corresponding to 2.75 l). A purification material or oxidizing material of the composition reproduced above, or alternatively an oxidizing material of 1 part of manganese dioxide, 1 part of uric and/or barbituric acid and 2 parts of hydrogen peroxide (calculated as 100%), is employed for combustion installations with waste gas temperatures of 120°–500° C. In this case, the solids are added during pelletizing and the peroxide is applied by impregnation. Pure manganese dioxide is employed for the purification of gases at above 500° C. If elimination of nitrogen oxide is not necessary, the use of oxidizing material is unnecessary and it can be replaced by using a corresponding quantity of metal oxide material.

The purification material described above as alternative 1 is active for about 360 days (=1 year). In this period, about 5.65 kg of nitrogen oxides and 12.0 kg of sulfur dioxide are chemically bound. The purification material thus contains 10% by weight of bound sulfur dioxide and about 4.5% by weight of bound $NO_x$. Under certain circumstances, this material can be processed into sulfuric acid and nitric acid.

After the purification, the flue gases contain 5–10 mg of $SO_2/Bm^3$ and 12 mg of $NO_x/Bm^3$. The purification proceeds in accordance with the purification diagram reproduced below:

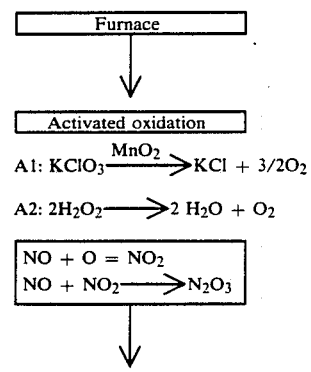

```
Oxidic purification material
Me(OH)₂ + NO + NO₂ + O₂ = Me(NO₃)₂ + H₂O
         MeO + SO₂ = MeSO₃
         MeO + SO₃ = MeSO₄
```

EXAMPLE 2

A passenger motor vehicle with a fuel consumption of 10 kg/100 km releases about 108.3 Nm³ of waste gases having a temperature of between 500° and 600° C. and a composition of 17.8 Nm³ of carbon oxide (of which 4–6% by volume are CO), 18.0 Nm³ of water, 5.5 Nm³ of oxygen and 67.0 Nm³ of nitrogen. The nitric oxide content is 180 to 285 mg/Nm³ and the nitrogen dioxide content is 150–355 mg/Nm³. Due to the high waste gas temperature to be assumed, pure manganese dioxide is used as the oxidizing agent for the nitrogen oxides. The purification material has the following composition.

| | | |
|---|---|---|
| Fine sand | 5,500 g | 51.44% by weight |
| Fly ash | 2,600 g | 24.3% by weight |
| Binder | 1,100 g | 10.2% by weight |
| Manganese dioxide material | 1,500 g | 14.1% by weight |
| Total | 10,700 g | 8.5 l |

The purification material is active for 5,000 km. In this period, about 1.26 kg of nitrogen oxides and 1.37 kg of sulfur dioxide are bound. The resulting purification material thus contains about 20% by weight of bound pollutants and can be processed into sulfuric acid and nitric acid. The purification proceeds in accordance with the purification diagram reproduced below:

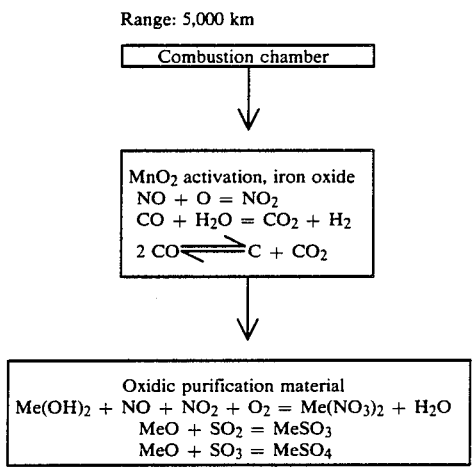

Range: 5,000 km

Combustion chamber

↓

MnO₂ activation, iron oxide
NO + O = NO₂
CO + H₂O = CO₂ + H₂
2 CO ⇌ C + CO₂

↓

Oxidic purification material
Me(OH)₂ + NO + NO₂ + O₂ = Me(NO₃)₂ + H₂O
         MeO + SO₂ = MeSO₃
         MeO + SO₃ = MeSO₄

Example 3

A coal-fired power station releases 1,250,000 Nm³/h of waste gases (flue gases) with 650 mg of $SO_2/Nm^3$ and 450 mg of $NO_x/Nm^3$ as pollutants into the atmosphere. The purification is carried out on the high-temperature side at about 550° C. Absorption material of the same percentage composition as in Example 2 is used. The manganese dioxide material is active for about 30 days (=1 month) in a year.

A total of 585 tonnes of $SO_2$ and 405 tonnes of $NO_x$ is absorbed. The quantitative composition of the purification material is as follows:

| | | |
|---|---|---|
| Sand | 2,760.00 | tonnes (= 51.7% by weight) |
| Fly ash | 1,300.00 | tonnes (= 24.2% by weight) |
| Binder | 550.00 | tonnes (= 9.8% by weight) |
| Manganese dioxide | 760.00 | tonnes (= 14.6% by weight) |
| Total | 5,366.25 | tonnes (sic) = about 4,500 m³ |

The purification material can be processed into sulfuric acid and nitric acid. After the purification the flue gases contain about 12.5 mg of $SO_2/Bm^3$ and about 15.0 mg of $NO_x/Bm^3$.

The $CO_2$ content of the waste gases does not interfere with the process of binding pollutants, and binding of $CO_2$ occurs only to a small extent.

Example 4

A coal-upgrading plant of a capacity of 1,000 tonnes of coal per day produces about 100,000 Nm³/h of reaction gas which, after the precipitation of slag, still has a temperature of about 780° C. The purification material moved in counter-current to the reaction gas is discharged at about 780° C. from the reaction zone and cooled in an air stream. The pellets are cooled down to a temperature of about 180° C. The heat to be recovered is E=100,000 (Nm³)×1.30 (kg/Nm³)×0.25 (kcal/kg*° C.)×600 (dT)×19,500,000 kcal (per hour).

What is claimed is:

1. A process for removing sulfur, nitrogen, and carbon oxides from combustion gases, said process comprising contacting said gases with a pellet composition comprising:
    manganese dioxide;
    35–75 wt% sand; and
    5–10 wt% cement or 3–5% wt% kaolin or combinations thereof.

2. A process in claim 1 wherein said composition further comprises potassium chlorate.

3. A process as in claim 2 wherein said composition comprises a weight ratio of potassium chlorate to maganese dioxide of about 10.

4. A process as in claim 2 wherein said composition comprises a weight ratio of potassium chlorate to manganese dioxide of about 20.

5. A process as in claim 1 wherein said composition further comprises 15–40 wt% fly ash, slag, fly dust, or combinations thereof.

6. A process as in claim 5 wherein said composition comprises 15–65 wt% of metal oxide.

7. A process as in claim 5 wherein said composition comprises 45–55% of metal oxide.

8. A process as in claim 5 wherein said composition comprises 5–15 wt% $Fe_2O_3$.

9. A process as in claim 8 wherein said composition comprises less than 10 wt% alkali or alkaline earth metals.

10. A process as in claim 9 wherein said composition comprises 6–8 wt% alkali or alkaline earth metals.

11. A process as in claim 1 wherein said composition comprises a surface area of 5–28.5 m²/g.

12. A process according to claim 11 wherein said composition further comprises a pore volume of 0.1–0.25 cm³/g within pore diameters of 200–1000 angstroms.

13. A process as in claim 1 wherein said composition further comprises hydrogen peroxide.

14. A process as in claim 13 wherein said composition further comprises uric or barbituric acid.

15. A process as in claim 13 wherein said hydrogen peroxide has been added to said composition by impregnation.

16. A process as in claim 1 wherein said composition comprises kaolin.

17. A process as in claim 16 wherein said composition is calcined at 800°–850° C. before said contacting.

18. A process as in claim 1 wherein said combustion gases are adjusted to have at least 10% relative humidity before contacting said composition.

19. A process as in claim 18 wherein water or water vapor is added to said gases to achieve said relative humidity.

20. A process as in claim 18 wherein said gases are cooled to achieve said relative humidity.

21. A process as in claim 1 wherein at least a portion of said sand and said cement, kaolin, or combinations thereof are in an adsorption particle discrete from an oxidizing particle comprising said manganese dioxide.

22. A process as in claim 21 wherein said particle comprising said manganese dioxide comprises at least a portion of said sand.

23. A process as in claim 22 further comprising simultaneous or independent periodic addition of each of said adsorption and oxidation particles.

24. A process as in claim 1 comprising withdrawal of at least a portion of said composition after contacting and binding sulfur and/or nitrogen oxides.

25. A process as in claim 24 further comprising recovery of at least a portion of the bound sulfur and/or nitrogen oxides as sulfuric acid, nitric acid, or both.

26. A process as in claim 24 further comprising recovering heat from the withdrawn pellet composition.

* * * * *